(No Model.)
E. F. GREENE & F. H. HENDRYX.
BAKING PAN.
No. 383,177. Patented May 22, 1888.
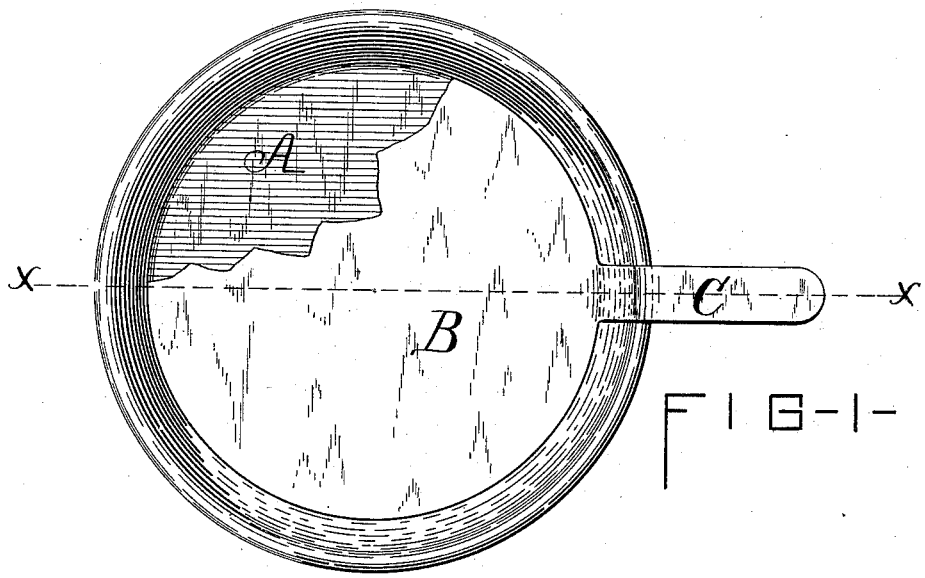
FIG-1-
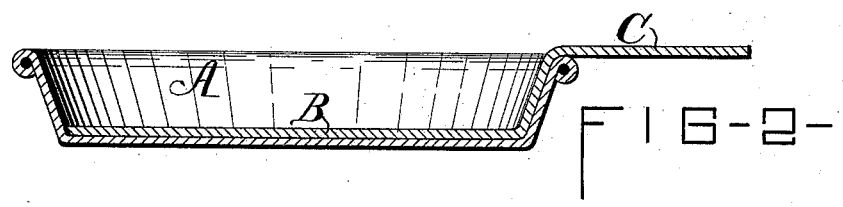
FIG-2-
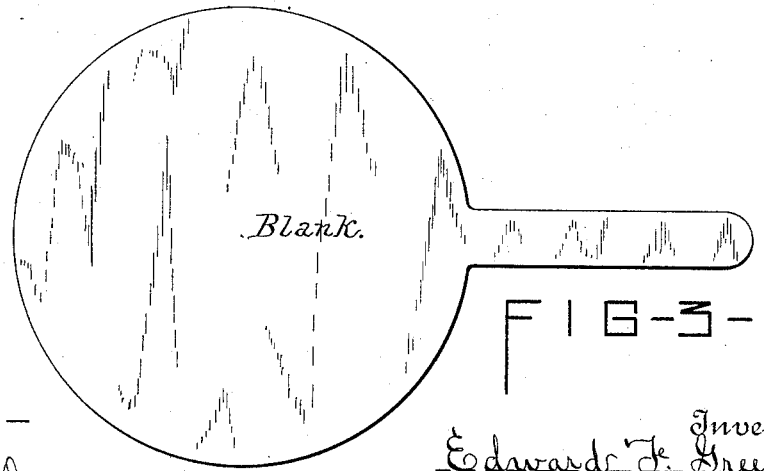
FIG-3-
Witnesses —
Morgan A. Dunn
Porter W. Wicks
Inventors —
Edward F. Greene
and Frank H. Hendryx
By their Attorney —
Wm. C. Raymond

UNITED STATES PATENT OFFICE.

EDWARD F. GREENE AND FRANK H. HENDRYX, OF BATH, NEW YORK.

BAKING-PAN.

SPECIFICATION forming part of Letters Patent No. 383,177, dated May 22, 1888.

Application filed November 28, 1887. Serial No. 256,326. (No model.)

*To all whom it may concern:*

Be it known that we, EDWARD F. GREENE and FRANK H. HENDRYX, of Bath, county of Steuben, in the State of New York, and citizens of the United States, have invented certain new and useful Improvements in Baking-Pans, of which the following is a specification, reference being had to the accompanying drawings, in which—

Figure 1 is a top plan view of our baking-pan; Fig. 2, a vertical transverse section thereof, taken on line $x\,x$, Fig. 1; and Fig. 3, a detail view of the blank from which the false bottom and its handle are formed.

Similar letters of reference indicate corresponding parts throughout the several views.

Our invention relates, generally, to an improved baking-pan for baking pie, cake, and other pastry; and our object is to produce a pan of such construction that the baked pastry may be readily removed from the pan without danger of crumbling or breaking, a pan simple to operate, being easy to handle when withdrawing from a stove-oven, and simple and inexpensive in its manufacture.

Our invention consists in the novel features of construction and operation hereinafter described, and which are specifically enumerated in the several claims hereunto annexed.

It is constructed as follows: A represents the pan proper provided with a fixed bottom. B is a detached or false bottom having integral therewith (or connected thereto) the side handle, C, said false or detached bottom fitting into the lower part of the pan A and resting directly on the pan's bottom, as clearly shown in Fig. 2 of the drawings.

The false bottom B is perfectly flat and of an equal thickness, and the side handle, C, integral with or connected thereto, is formed at the side or edge thereof and extends up the side of the pan in close contact therewith, and thence horizontally out beyond the pan's edge the desired distance.

The false bottom B and its side handle, C, we preferably form (by bending) from a blank stamped or cut out of a single piece of tin or other sheet metal, whereby the parts B and C, being integral, are more durable and strong and cheaper of manufacture than when said parts are formed of separate pieces of sheet metal fastened together.

Our improved construction permits of the withdrawal from the stove-oven of the baking-pan and the baked pastry therein by means of the side handle, C, connected to the false or detachable bottom, as the adhesion of the pastry to the sides of the pan prevents displacement of the false bottom and its handle portion during said operation. After the pan's removal the detached or false bottom B, with pastry resting upon it, may, by means of the handle C, be raised up out of the pan, first having loosened the pastry from the sides of the pan by the insertion of a knife around the sides thereof. The false bottom being now out of the pan, the insertion of a knife between said bottom and the bottom of the pastry allows its separation therefrom without danger of crumbling or breaking.

It is self-evident that the utilization of our false bottom and its side handle prevents the defacement or injury to the pastry incident to the employment of false bottoms constructed with a central tube, either with or without a handle at its top.

Having described our invention, what we claim as new, and desire to secure by Letters Patent, is—

1. A baking-pan constructed as herein shown and described, consisting of the sides and permanent bottom, the detachable auxiliary or false bottom adapted to lie upon the permanent bottom, the said detachable bottom being provided with a side handle formed integral therewith and extending up along the inner side of the pan, and thence longitudinally out beyond the pan's edge, the aforesaid detachable bottom and its handle portion being formed from a blank stamped or cut out of one and the same piece of tin or sheet metal, substantially as described.

2. A baking-pan constructed with a fixed or permanent bottom and provided with a removable auxiliary or false bottom adapted to lie upon the permanent bottom, and having connected thereto a side handle that extends up along the inside of the pan's side, and thence longitudinally out beyond the edge or rim of the pan sufficiently to admit of its proper handling, all combined substantially as described and shown, and for the purposes specified.

3. A baking-pan constructed with a permanent bottom and having removably mounted thereon an auxiliary or false bottom provided with a handle portion extending from a side thereof upward and in proximity to the inner surface of the pan's side, and thence extending beyond the top thereof a suitable distance, substantially as described, and for the purposes specified.

In witness whereof we have hereunto set our hands this 11th day of November, 1887.

EDWARD F. GREENE. [L. S.]
  FRANK H. HENDRYX. [L. S.]

In presence of—
 B. G. GAGE,
 K. S. GAGE.